United States Patent [19]

Gutweiler

[11] 4,305,841

[45] Dec. 15, 1981

[54] PROCESS FOR THE MANUFACTURE OF A CATALYST

[75] Inventor: Klemens Gutweiler, Niedernhausen, Fed. Rep. of Germany

[73] Assignee: Hoechst Aktiengesellschaft, Frankfurt am Main, Fed. Rep. of Germany

[21] Appl. No.: 74,749

[22] Filed: Sep. 12, 1979

Related U.S. Application Data

[63] Continuation of Ser. No. 5,508, Jan. 22, 1979, abandoned.

[30] Foreign Application Priority Data

Jan. 23, 1978 [DE] Fed. Rep. of Germany ....... 2802819

[51] Int. Cl.$^3$ .............................................. C08F 4/64
[52] U.S. Cl. ................................... 252/430; 252/428; 252/431 R; 526/114
[58] Field of Search .................... 252/428, 430, 431 R

[56] References Cited

U.S. PATENT DOCUMENTS

| | | | |
|---|---|---|---|
| 3,071,601 | 1/1963 | Aries | 252/430 X |
| 3,412,174 | 11/1968 | Kroll | 252/428 X |
| 3,622,521 | 11/1971 | Hogan et al. | 252/430 |
| 3,752,795 | 8/1973 | Boone | 252/431 R X |
| 3,773,742 | 11/1973 | Kruse | 252/431 R X |
| 3,798,250 | 3/1974 | Kruse | 252/431 R X |
| 3,879,362 | 4/1975 | Chalfont et al. | 252/431 R X |
| 4,016,343 | 4/1977 | Hoff et al. | 252/431 R X |

FOREIGN PATENT DOCUMENTS

| | | |
|---|---|---|
| 2118366 | 11/1972 | Fed. Rep. of Germany . |
| 2192121 | 8/1974 | France . |
| 1415649 | 11/1975 | United Kingdom . |
| 1433052 | 4/1976 | United Kingdom . |

*Primary Examiner*—Patrick Garvin
*Attorney, Agent, or Firm*—Curtis, Morris & Safford

[57] ABSTRACT

A catalyst for the polymerization of 1-olefins is prepared by successively applying a chromate ester and a titanium ester to a carrier containing silicon dioxide, in the absence of an unsaturated polymerizable hydrocarbon, and activating with an aluminum-organic compound. In the manufacture of the catalyst no washing liquids are obtained from which metal compounds would have to be separated. In the presence of hydrogen the catalyst gives a high yield of polymers with broad molecular weight distribution and a small content of high molecular constituents. The films made therefrom are practically free from specks.

28 Claims, No Drawings

PROCESS FOR THE MANUFACTURE OF A CATALYST

This is a continuation of application Ser. No. 005,508, filed Jan. 22, 1979 and now abandoned.

This invention relates to a process for the manufacture of a mixed catalyst of the Ziegler type and to the catalyst obtained by this process.

A process for polymerizing 1-olefins has been proposed using a catalyst consisting of a chromate ester fixed on a carrier and an aluminum-organic compound (cf. DE-OS No. 2,000,031). The yields obtained in this process are, however, not sufficient for a further processing of the polymer without removal of the catalyst remainders.

Another process for polymerizing ethylene has been proposed according to which the catalyst used consists of a chromate ester precipitated on a $SiO_2$ carrier and treated with a phenol compound and a strong reducing agent (cf. DE-OS No. 2,713,877). Though the phenol treatment increases the yield, it does not enable one to carry out a polymerization process without removal of the catalyst from the polymer.

It has now been found that very high polymer yields are obtained when a catalyst is used which has been prepared by fixing a chromate ester on a carrier, pretreating with a titanium ester in the absence of an unsaturated polymerizable hydrocarbon (component A) and activating with an aluminum-organic compound (component B).

It is, therefore, the object of the present invention to provide a process for the manufacture of a catalyst by applying a chromate ester to a carrier containing silicon dioxide and mixing the reaction product obtained (component A) with an aluminum-organic compound (component B), wherein component A is prepared by applying a chromate ester of the formula $$(RO)_2CrO_2,$$

in which R denotes a tertiary alkyl or aralkyl group having from 4 to 24 carbon atoms, on an oxide or mixed oxide of silicon and/or aluminum and treating the carrier and chromate ester, in the absence of an unsaturated polymerizable hydrocarbon, with a titanium compound of the formula $$Ti(OR^4)_4,$$

in which $R^4$ denotes a linear or branched alkyl group having from 1 to 12 carbon atoms, in an amount such that the proportion of Cr to Ti is of from 1:1 to 1:10.

It is another object of the present invention to provide the catalyst produced by the above process said catalyst being useful for polymerizing 1-olefins.

For the manufacture of the catalyst, first a chromate ester is fixed on a carrier.

Suitable chromate esters are those of the formula $$(RO)_2CrO_2$$

in which R denotes a tertiary alkyl or aralkyl group having from 4 to 24, preferably 4 to 10, carbon atoms. Chromate esters of this type can be obtained in known manner by reacting a tertiary alcohol of the formula $$R^1R^2R^3COH.$$

in which $R^1$, $R^2$ and $R^3$ denote identical or different alkyl groups having from 1 to 15 carbon atoms or aryl groups having from 6 to 10 carbon atoms, with $CrO_3$ in an inert solvent in the presence of a water-binding agent. Alcohols to be used are, for example, tert.-butanol, 2-methyl-2-butanol, tert.hexanol, dimethylpentadecyl carbinol, and triphenyl carbinol, tert.butanol being preferred. The molar ratio of $CrO_3$ to alcohol is in the range of from 1:1 to 10:1, preferably 2:1 to 4:1.

Suitable solvents are all solvents useful in Ziegler polymerization, such as aliphatic or cycloaliphatic hydrocarbons, for example pentane, hexane, heptane, cyclohexane, and methylcyclohexane; aromatic hydrocarbons, for example benzene, toluene, and xylene, or gasoline or hydrogenated Diesel oil fractions which have been carefully freed from oxygen, sulfur compounds and humidity. Aliphatic and cycloaliphatic hydrocarbons are preferred.

The concentration of $CrO_3$ in the solution suitably range from 1 to 30 millimols, preferably 5 to 20 millimols, per liter. With higher concentrations the danger of decomposition and flocculation of the chromate ester exists, especially under the action of light.

The reaction is carried out at a temperature of from 0° to 40° C., preferably 15° to 25° C., and lasts for 1 minute to 360 minutes depending on the temperature. The water-binding agent, preferably anhydrous magnesium sulfate, and the excess $CrO_3$ are then removed by filtration.

Suitable carrier materials are porous oxides or mixed oxides of silicon and/or aluminum having a specific surface of from 50 to 1,000 preferably 100 to 800, and more preferably 150 to 650, m²/g, and a pore volume in the range of from 0.2 to 3, preferably 0.4 to 3, and more preferably 0.6 to 2.7, ml/g. The particle size is in the range of from 1 to 500 μm, preferably 10 to 200 μm, and more preferably 20 to 100 μm. Depending on the specific surface and the thermal pretreatment, the number of hydroxyl groups is in the range of from 0.5 to 50, preferably 1 to 20 and more preferably 1.5 to 10, millimols per gram of carrier material. Oxides of this type are produced for specific use as carriers for supported catalysts and are available on the market.

Prior to the reaction of the carrier with the chromium compound it must be dried at a temperature of from 120° to 800° C., preferably 200° to 500° C., in order to remove any water bound by adsorption. After drying, the carrier material is stored in an inert gas such as nitrogen or argon with the exclusion of air and water.

For the reaction of the carrier material with the chromium compound the former is suspended in an inert diluent, the solution of the chromium compound is added at a temperature of from 0° to 40° C., preferably 15° to 25° C., and the two components are allowed to act on each other for 1 to 360 minutes. The proportion of chromium compound to carrier material is chosen in such a manner that 1 to 40, preferably 2 to 25, millimols of chromate ester are used per 100 g of carrier material. Under these conditions the chromium compound is quantitatively adsorbed on the carrier material. The reaction is complete when, after sedimentation of the carrier, no more chromium can be detected in the supernatant solution.

Next, the chromium compound fixed on the carrier is reacted in the same suspension, in the absence of an unsaturated polymerizable hydrocarbon, with a tetravalent titanium compound having the formula $Ti(OR^4)_4$ in which $R^4$ denotes a linear or branched alkyl group having from 1 to 12, preferably 3 to 8, carbon atoms and the radicals $R^4$ can be identical or different from one another. Examples are ethyl, i-propyl, n-butyl, i-butyl, tert.-butyl, amyl, octyl and dodecyl titanate (IV), isopropyl titanate(IV) being preferred.

As already mentioned, the reaction of the chromium compound fixed on the carrier with the titanium compound takes place in the solvent in which the chromate ester has been prepared. The concentration of the chromium compound is in the range of from 1 to 30, preferably 5 to 20, millimols per liter, the proportion of Cr to Ti is in the range of from 1:1 to 1:10, preferably 1:1 to 1:6. The reaction temperature is between 0° and 100° C., preferably between 20° and 70° C. and the reaction time ranges from 0.5 to 80 hours, preferably 0.5 to 24 hours. During the reaction the originally brown color of the carrier material turns green.

Catalyst component A produced in this manner is used either directly in the form of the suspension or after removal of the diluent and drying.

Suitable components B are organic compounds of the metals of main groups I, II and III of the Periodic Table, preferably aluminum-organic compounds.

Especially good results are obtained with aluminum trialkyls of the formula $AlR^5_3$ or aluminum dialkyl hydrides of the formula $AlR^5_2H$ in which $R^5$ denotes a hydrocarbon radical having from 1 to 16 carbon atoms, preferably an alkyl radical having from 1 to 16 and more especially from 2 to 4 carbon atoms, such as $Al(C_2H_5)_3$, $Al(C_2H_5)_2H$, $Al(C_3H_7)_2H$, $Al(i-C_4H_9)_3$ and $Al(i-C_4H_9)_2H$.

It is likewise possible to use polymeric aluminum-organic compounds consisting of structural units of the formula

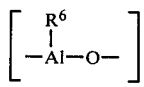

in which $R^6$ denotes an alkyl group having from 2 to 12, preferably from 2 to 6, carbon atoms, for example ethyl, propyl, isopropyl, butyl, isobutyl, pentyl, hexyl, isooctyl, and dodecyl. Compounds of this type can be prepared from the corresponding aluminum trialkyls, dialkyl hydrides and alkyl dihydrides by cautiously adding a calculated amount of water to the solution of such a compound in an inert solvent, for example as described above. In this reaction the molar proportion of water to aluminum alkyl is from 0.5 to 1.25:1, preferably 0.85:1 to 1.05:1, the reaction temperature being in the range of from 0° to 100° C., preferably about 10° to 65° C. The alkyl aluminum oxides obtained in this manner are polymeric compounds. Preferred compounds of this class are those formed by reacting aluminum triisobutyl with water in a proportion of 1:1.

Further compounds suitable as component B are chlorine-containing aluminum-organic compounds such as dialkyl aluminum monochloride of the formula $R^5_2AlCl$ or alkyl aluminum sesquichlorides of the formula $R^5_3Al_2Cl_3$ in which $R^5$ denotes an alkyl radical having from 1 to 16 carbon atoms, more preferably 2 to 4 carbon atoms. There are mentioned by way of examples $(C_2H_5)_2AlCl$, $(i-C_4H_9)_2AlCl$, $(C_2H_5)_3Al_2Cl_3$.

Further suitable aluminum-organic compounds are the reaction products of aluminum trialkyls or aluminum dialkyl hydrides, the alkyl radicals of which have from 1 to 16 carbon atoms, with dienes containing from 4 to 20 carbon atoms.

Best results are obtained with polymeric alkyl aluminum oxides.

The catalyst according to the invention is used to polymerize at least one 1-olefin of the formula $R^7$—CH=CH_2 in which $R^7$ denotes hydrogen or a linear or branched alkyl radical having from 1 to 10, preferably 1 to 8, carbon atoms, for example ethylene, propylene, butene-(1), hexene-(1), 4-methylpentene-(1) and octene-(1). It is preferred to polymerize ethylene alone or in the form of a mixture of at least 70% by weight of ethylene with at most 30% by weight of another 1-olefin of the above formula. Especially good results are obtained by polymerizing ethylene alone or a mixture of at least 92% by weight of ethylene and at most 8% by weight of another 1-olefin of the above formula.

The molecular weight of the polymer is regulated in known manner, preferably by adding hydrogen.

The polymerization is carried out in solution, in suspension or in the gaseous phase, either continuously or discontinuously, at a temperature of from 20° to 150° C., preferably 60° to 140° C. The pressure amounts to 0.5 to 50 bar, the, industrially-speaking, especially interesting range of from 1 to 40 bar being preferred.

In the polymerization the chromium compound (component A) is used in a concentration of from 0.001 to 1.5, preferably 0.005 to 0.1 mmol (calculated on Cr) per liter of dispersion medium or reactor volume. The metal-organic compound (component B) is used in a concentration of from 0.05 to 15, preferably 0.1 to 10, mmols per liter of dispersion medium or reactor volume. In principle, higher concentrations are also possible.

The suspension- or solution-polymerization is carried out in an inert solvent as usual in the Ziegler low pressure process and as specified above.

The process of the invention for the manufacture of a catalyst has the special advantage that no excess amounts of metal compound must be removed from catalyst componenet A by washing since the chromium compound used as well as the titanium(IV) compound quantitatively react with the carrier material. Hence, no washing liquids are obtained from which metal compounds have to be separated prior to working up and no metal-containing waste waters or sludges are formed.

The catalyst according to the invention gives a high yield of a polymer with broad molecular weight distribution. Owing to the fact that the polymers contain only small proportions of high molecular constituents, the films made therefrom are practically free from specks. Moreover, the polymers have an outstanding stability to light.

A further advantage of the catalyst according to the invention resides in the fact that by the treatment with the titanium ester of the chromate ester fixed on the carrier with the titanium ester, in the absence of an unsaturated polymerizable hydrocarbon, the sensitivity of the system to hydrogen is greatly increased, whereby the manufacture of polymers having good processing properties is facilitated.

The following examples illustrate the invention.

EXAMPLE 1

With the exclusion of air and humidity, 3 g of anhydrous magnesium sulfate and then 0.5 g (5 mmols) of $CrO_3$ are added while stirring at 20° C. to a solution of 0.2964 g (4 mmols) of tert.-butanol in 150 ml of anhydrous hexane. Stirring of the suspension is continued for 20 minutes at 20° C., whereupon it is filtered under a protective gas. The red solution of tert.-butyl chromate is used for the following operations without further purification.

Silicic acid having a specific surface of about 300 m²/g, a pore volume of 1.65 cc/g and a mean particle size of 100 μm is dried for 4 hours at 460° C. under argon in a fluidized bed and then maintained under argon. 26 g of the silicic acid treated in this manner are suspended in 100 ml of hexane at 20° C. and mixed, while stirring, with the solution of 2 mmols of tert.-butyl chromate in 150 ml of hexane under a blanket of inert gas. Next, 10 mmols of $Ti(i-C_3H_7)_4$ are added and the mixture is left to stand for 24 hours at 20° C. It is then evaporated to dryness in vacuo in a rotary evaporator.

Catalyst component A obtained in the form of a powder is used for the polymerization of ethylene.

To this end, a 200 l vessel is fed with 100 l of a hydrogenated Diesel oil fraction (boiling range 130° to 170° C.) and the air in the vessel is removed by passing through nitrogen. The vessel is heated to 85° C. and component A is introduced in the form of the aforesaid powder together with 1 mmol of poly-i-butyl aluminum oxide. Ethylene is then introduced as well as hydrogen in an amount such that the partial pressure of the latter in the gas space amounts to 5% with a total pressure of 6 bars. The pressure is maintained by further introducing ethylene. After a polymerization period of 8 hours at 85° C., 38 kg of polyethylene are obtained, corresponding to a yield of 2,380 g of polymer per mmol of Cr per hour.

| | |
|---|---|
| RSV | 5.01 dl/g |
| MFI 190 / 5 | 0.13 g/10 min. |
| MFI 190 / 15 | 1.5 g/10 min. |
| $\frac{\text{MFI } 190 / 15}{\text{MFI } 190 / 5}$ = 11.4 | |
| $\overline{M_w} / \overline{M_n}$ = 20.5 | |

EXAMPLE 2

A catalyst is prepared as described in Example 1 with the exception that 2 mmols of tert.-butyl chromate are adsorbed on 24 g of the silicic acid, the suspension is admixed with 10 mmols of $Ti(O-i-C_3H_7)_4$, and the mixture is refluxed for 1 hour.

In the polymerization in the 200 l vessel as described in Example 1 a total pressure of 7 bars is obtained with a proportion of $H_2$ of 5% in the gas space. After a polymerization period of 8 hours, 31.84 kg of polyethylene are obtained, corresponding to a yield of 1,990 g of polymer per mmol of Cr per hour.

| | |
|---|---|
| RSV | 5.09 dl/g |
| MFI 190 / 5 | 0.15 g/10 min. |
| MFI 190 / 15 | 20 g/10 min. |

What is claimed is:

1. A process for producing a catalyst, which comprises reacting, in the absence of water and in an inert diluent and under inert gas, a chromate ester of the formula $(RO)_2CrO_2$, wherein R is a tertiary alkyl or aralkyl of from 4 to 24 carbon atoms, with an anhydrous carrier selected from the group consisting of oxides of silicon, oxides of aluminum and mixtures thereof, the chromate ester being reacted with the carrier at a temperature of from 0° to 40° C. for a period of from 1 to 360 minutes in a proportion of from 1 to 40 millimols of chromate ester per 100 g of carrier; treating the reaction product thereof, which is suspended in said inert diluent, at a temperature of from 0° to 100° C. for a period of from 0.5 to 80 hours, in the absence of an unsaturated polymerizable hydrocarbon and under inert gas, with a titanium compound of the formula

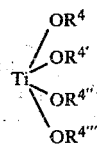

wherein $R^4$, $R^{4'}$, $R^{4''}$ and $R^{4'''}$ are the same or not all the same and each is a linear or branched alkyl group of from 1 to 12 carbon atoms, the amount of said titanium compound being such that the proportion of Cr to Ti is of from 1:1 to 1:10; and mixing said treated reaction product, either while said product is still in suspension or after removal of the diluent and drying, with an aluminum-organic compound.

2. A process for producing a catalyst, which comprises reacting, in the absence of water and in an inert diluent and under inert gas, a chromate ester of the formula $(RO)_2CrO_2$, wherein R is tertiary alkyl or aralkyl of from 4 to 24 carbon atoms, with a carrier previously dried at a temperature of from 120° to 800° C. to remove all water adsorbed thereon and selected from the group consisting of oxides of silicon, oxides of aluminum and mixtures thereof, the chromate ester being reacted with the carrier at a temperature of from 0° to 40° C. for a period of from 1 to 360 minutes in a proportion of from 1 to 40 millimols of chromate ester per 100 g of carrier; treating the reaction product thereof, which is suspended in said inert diluent, at a temperature of from 0° to 100° C. for a period of from 0.5 to 80 hours, in the absence of an unsaturated polymerizable hydrocarbon and under inert gas, with a titanium compound of the formula

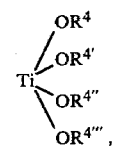

wherein $R^4$, $R^{4'}$, $R^{4''}$ and $R^{4'''}$ are the same or not all the same and each is a linear or branched alkyl grop of from 1 to 12 carbon atoms, the amount of said titanium compound being such that the proportion of Cr to Ti is of from 1:1 to 1:10; and mixing said treated reaction product, either while said product is still in suspension or after removal of the diluent and drying, with an aluminum-organic compound.

3. A catalyst produced by a process as defined in claim 1.

4. A catalyst produced by a process as defined in claim 2.

5. A process as defined in claim 1, wherein R is tertiary alkyl or aralkyl of from 4 to 10 carbon atoms.

6. A catalyst produced by a process as defined in claim 5.

7. A process as defined in claim 1, wherein said carrier has a specific surface of from 50 to 1000 m²/g, a pore volume in the range of from 0.2 to 3 ml/g, a particle size in the range of from 1 to 500 μm, and a hydroxyl group content in the range of from 0.5 to 50 millimols per gram of carrier.

8. A catalyst produced by a process as defined in claim 7.

9. A process as defined in claim 7, wherein said specific surface is of from 100 to 800 m²/g, said pore volume is in the range of from 0.4 to 3 ml/g, said particle size is in the range of from 10 to 200 μm and the hydroxyl group content is in the range of from 1 to 20 millimols per gram of carrier.

10. A catalyst produced by a process as defined in claim 9.

11. A process as defined in claim 9, wherein the carrier has a specific surface of from 150 to 650 m²/g, a pore volume in the range of from 0.6 to 2.7 ml/g, a particle size in the range of from 20 to 100 μm and a hydroxyl group content in the range of from 1.5 to 10 millimols per gram of carrier.

12. A catalyst produced by a process as defined in claim 11.

13. A process as defined in claim 1, wherein the temperature is of from 15° to 25° C. and the proportion is of from 2 to 25 millimols of chromate ester per 100 g of carrier.

14. A catalyst produced by a process as defined in claim 13.

15. A process as defined in claim 1, wherein $R^4, R^{4'}$, R" and R'" are the same or not all the same and each is a linear or branched alkyl of from 3 to 8 carbon atoms.

16. A catalyst produced by a process as defined in claim 15.

17. A process as defined in claim 1, wherein the titanium compound is ethyl titanate, i-propyl titanate, n-butyl titanate, i-butyl titanate, tert.-butyl titanate, amyl titanate, octyl titanate or dodecyl titanate.

18. A catalyst produced by a process as defined in claim 17.

19. A process as defined in claim 1, wherein the reaction temperature is of from 20° to 70° C., the reaction time is of from 0.5 to 24 hours and the proportion of chromium to titanium is of from 1:1 to 1:6.

20. A catalyst produced by a process as defined in claim 19.

21. A process as defined in claim 1, wherein the aluminum organic compound is a compound of the formula $AlR^5{}_3$ or $AlR^5{}_2H$, $R^5$ being hydrocarbon of from 1 to 16 carbon atoms; a polymeric aluminum organic compound consisting of monomers of the formula

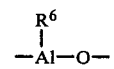

wherein $R^6$ is alkyl of from 2 to 12 carbon atoms; or a compound of the formula $R^7{}_2AlCl$ or $R^7{}_3Al_2Cl_3$ wherein $R^7$ is alkyl of from 1 to 16 carbon atoms or a reaction product of an aluminum trialkyl or aluminum dialkyl hydride, each alkyl of which is of from 1 to 16 carbon atoms, with a diene of from 4 to 20 carbon atoms.

22. A catalyst produced by a process as defined in claim 21.

23. A process as defined in claim 21, wherein $R^5$ is alkyl of from 1 to 16 carbon atoms, $R^6$ is alkyl of from 2 to 6 carbon atoms and $R^7$ is alkyl of from 2 to 4 carbon atoms.

24. A catalyst produced by a process as defined in claim 23.

25. A process as defined in claim 1, wherein the aluminum organic compound is mixed with said titanium compound-treated reaction product in a proportion such that the ratio of chromium to the aluminum organic compound is 0.2:1 to 0.1:1.

26. A catalyst produced by a process as defined in claim 25.

27. A process as defined in claim 25, wherein the ratio is of from 0.05:1 to 0.01:1.

28. A catalyst produced by a process as defined in claim 27.

* * * * *